United States Patent Office 2,908,718
Patented Oct. 13, 1959

2,908,718

2,6-DI-TERTIARYALKYL-4-ALKOXYPHENOLS

Robert H. Rosenwald, Western Springs, Ill., assignor, by mesne assignments, to Universal Oil Products Company, Des Plaines, Ill., a corporation of Delaware No Drawing. Application January 18, 1954
Serial No. 404,793

10 Claims. (Cl. 260—613)

This application is a continuation-in-part of my copending application Serial No. 177,338, filed August 2, 1950, now abandoned, which, in turn, is a continuation-in-part of application Serial No. 111,347, filed August 19, 1949, now Patent No. 2,679,459, May 25, 1954, and relates to a novel composition of matter comprising a dialkyl-alkoxyphenol of a particular configuration.

In one embodiment the present invention relates to a novel composition of matter comprising a 2,6-di-tert-alkyl-4-alkoxyphenol.

In a specific embodiment the present invention relates to a novel composition of matter comprising 2,6-di-tert-butyl-4-methoxyphenol.

In another specific embodiment the present invention relates to a novel composition of matter comprising 2,6-di-tert-amyl-4-ethoxyphenol.

The 2,6-di-tert-alkyl-4-alkoxyphenols of the present invention require special methods of preparation as will be hereinafter set forth.

The 2,6-di-tert-alkyl-4-alkoxyphenols of the present invention may be represented by the following general formula:

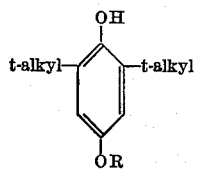

where R is an alkyl group.

The preferred compounds of the present invention comprise those in which R is an alkyl radical of not more than about 4 carbon atoms and thus the alkoxy group (OR) includes methoxy, ethoxy, propoxy and butoxy groups. However, other compounds included within the broad scope of the present invention comprise those in which R comprises amyl, hexyl, heptyl, octyl, nonyl, decyl or larger alkyl groups.

Typical representative compounds of the 2,6-di-tert-alkyl-4-alkoxyphenols include 2,6-di-tert-butyl-4-methoxyphenol, 2,6-di-tert-butyl-4-ethoxyphenol, 2,6-di-tert-butyl-4-propoxyphenol, 2,6-di-tert-butyl-4-butoxyphenol, etc., 2,6-di-tert-amyl-4-methoxyphenol, 2,6-di-tert-amyl-4-ethoxyphenol, 2,6-di-tert-amyl-4-propoxyphenol, 2,6-di-tert-amyl-4-butoxyphenol, etc., 2,6-di-tert-hexyl-4-methoxyphenol, 2,6-di-tert-hexyl-4-ethoxyphenol, 2,6-di-tert-hexyl-4-propoxyphenol, 2,6-di-tert-hexyl-4-butoxyphenol, etc., 2,6-di-tert-heptyl-4-methoxyphenol, 2,6-di-tert-heptyl-4-ethoxyphenol, 2,6-di-tert-heptyl - 4 - propoxyphenol, 2,6-di-tert-heptyl-4-butoxyphenol, etc., 2,6-di-tert-octyl-4-methoxyphenyl, 2,6-di-tert-octyl-4-ethoxyphenol, 2,6 - di-tert-octyl-4-propoxyphenol, 2,6-di-tert-octyl-4-butoxyphenol, etc., 2,6-di-tert-nonyl-4-methoxyphenol, 2,6-di-tert-nonyl-4-ethoxyphenol, 2,6-di-tert-nonyl-4-propoxyphenol, 2,6-di-tert-nonyl-4-butoxyphenol, etc., 2,6-di-tert-decyl-4-methoxy-phenol, 2,6-di-tert-decyl-4-ethoxyphenol, 2,6-di-tert-decyl-4-propoxyphenol, 2,6-di-tert-decyl-4-butoxyphenol, etc., 2,6-di-tert-undecyl-4-methoxyphenol, 2,6-di-tert-undecyl-4-ethoxyphenol, 2,6-di-tert-undecyl - 4 - propoxyphenol, 2,6-di-tert-undecyl-4-butoxyphenol, etc., 2,6-di-tert-dodecyl - 4 - methoxyphenol, 2,6-di-tert-dodecyl-4-ethoxyphenol, 2,6-di-tert-dodecyl-4-propoxyphenol, 2,6-di-tert-dodecyl-4-butoxyphenol, etc. Also included within the present invention are compounds in which the tertiary groups are different as, for example, in such compounds as 2-tert-butyl-6-tert-amyl-4-methoxyphenol, 2-tert-butyl-6-tert-amyl-4-ethoxyphenol, 2-tert-butyl-6-tert-amyl-4-propoxyphenol, 2-tert-butyl-6-tert-amyl-4-butoxyphenol, etc., 2-tert-hexyl-6-tert-octyl-4-methoxyphenol, 2-tert-hexyl-6-tert-octyl - 4 - ethoxyphenol, 2-tert-hexyl-6-tert-octyl-4-propoxyphenol, 2-tert-hexyl-6-tert-octyl-4-butoxyphenol, etc.

While the 2,6-di-tert-alkyl-4-alkoxyphenol of the present invention may be prepared in any suitable manner, special methods of preparation usually are required. In one method, 2,6-di-tert-alkyl-4-alkoxyphenols may be prepared by starting with p-bromophenol and alkylating the same with a suitable olefin or tertiary alcohol to form the corresponding 2,6-di-tert-alkylphenol. The bromo radical is removed by reductive treatment with nickel, and an alkoxy group is inserted in the 4-position in any suitable manner. In one method the 2,6-di-tert-alkyl-phenol may be nitrated to form the corresponding 4-nitro compound, which is reduced to the amine compound by hydrogenation, and then is diazotized and hydrolyzed with a nitrous acid to form the corresponding 2,6-di-tert-alkyl-hydroquinone which is then methylated, ethylated, propylated or butylated, as desired, by reaction with the corresponding dialkyl sulfate or in any other suitable manner.

Another method of preparing 2,6-di-tert-butyl-4-methoxyphenols includes the butylation of 4-methoxyphenol under special methods. These conditions include the use of benzene as a diluent and small amounts of sulfuric acid catalyst. The temperature of reaction is of the order of 60–75° C. The yields of 2,6-di-tert-butyl-4-methoxyphenol by this method of preparation are low and require careful separation from the other products of the reaction.

The novel compounds of the present invention will have various uses, including intermediate compounds for the preparation of pharmaceuticals and as antioxidants for retarding oxidative deterioration of unstable organic materials. In connection with the latter use, it has been found and will be shown in the following examples that 2,6-di-tert-butyl-4-methoxyphenol, having the configuration of the novel compounds of the present invention, is unexpectedly superior as an antioxidant in the stabilization of lard as compared to 2-tert-butyl-4-methoxyphenol, for example, which does not have the configuration herein described. Similarly, 2,6-di-tert-butyl - 4 - methoxyphenol is considerably better than 2-methyl-6-tert-butyl-4-methoxyphenol and 2-methyl-5-tert-butyl-4-methoxyphenol.

The following examples are introduced to illustrate further the novelty and utility of the present invention but not with the intention of unduly limiting the same.

Example 1

2,6-di-tert-butyl-4-methoxyphenol was prepared as follows:

4-methoxyphenol (2 moles) in 1000 grams of benzene was butylated with isobutylene (213 grams, 3.8 mols) in the presence of 6 grams of concentrated sulfuric acid over a three hour period at a temperature of 67–72°. After two hours of alkylation an additional 2 grams of sulfuric acid were added. The cooled reaction mixture was extracted with 800 cc. of Claisen solution. The caustic soluble material (154 grams) was separated and inspected by infrared as to composition. The benzene solution after Claisen extraction was evaporated to remove benzene, and the semisolid remaining was recrystallized from Skellysolve B. By this means 74 grams of crystalline product was isolated. The Skellysolve solution contained 135.5 grams of an oily material which, upon distillation, yielded some 2,6-di-tert-butyl-4-methoxyphenol (20 grams).

Analysis of 2,6-di-tert-butyl-4-methoxyphenol: Anal. called for $C_{15}H_{24}O_2$: C, 76.22; H, 10.24. Found: C, 76.38; H, 10.36.

*Example II*

2,6-di-tert-butyl-4-methoxyphenol, prepared in the manner described in Example I, was utilized as an antioxidant in lard having a normal stability period of 3½ hours. The stability period of the lard is determined by the "Swift" test. This test is described in detail in the articles by A. E. King, H. L. Roschen and W. H. Irwin, which appeared in the Oil and Soap, vol. X, No. 6, pages 106–109 (1933), and modified as described in the articles by R. W. Reimenschneider, J. Turer, and R. M. Spec, which appeared in the Oil and Soap, pages 169–171, September 1943. In general, this test comprises bubbling air through a sample of the lard until rancidity is determined organoleptically and by peroxide values.

The following table reports the results of the addition of 0.02% by weight of 2,6-di-tert-butyl-4-methoxyphenol to a sample of the lard. For comparative purposes, the table also reports the results of the addition to different samples of the lard of the same concentration of other additives.

| Additive: | Stability period, hours |
|---|---|
| 2,6-di-tert-butyl-4-methoxyphenol | 69 |
| 2-tert-butyl-4-methoxyphenol | 32.5 |
| 2-methyl-6-tert-butyl-4-methoxyphenol | 35 |
| 2-methyl-5-tert-butyl-4-methoxyphenol | 13.5 |
| 2,6-di-methyl-4-methoxyphenol | 18.75 |

From the data in the above table it will be noted that 2,6-di-tert-butyl-4-methoxyphenol is unexpectedly superior than the other additives.

I claim as my invention:
1. 2,6-di-tert-alkyl-4-alkoxyphenol.
2. 2,6-di-tert-butyl-4-alkoxyphenol.
3. 2,6-di-tert-butyl-4-methoxyphenol.
4. 2,6-di-tert-butyl-4-ethoxyphenol.
5. 2,6-di-tert-amyl-4-alkoxyphenol.
6. 2,6-di-tert-amyl-4-methoxyphenol.
7. 2,6-di-tert-hexyl-4-alkoxyphenol.
8. 2,6-di-tert-hexyl-4-methoxyphenol.
9. 2,6-di-tert-octyl-4-alkoxyphenol.
10. 2,6-di-tert-octyl-4-methoxyphenol.

References Cited in the file of this patent
UNITED STATES PATENTS

| 2,470,902 | Rosenwald | May 24, 1949 |
| 2,616,931 | Rosenwald | Nov. 4, 1952 |